United States Patent [19]
Yaoita

[11] Patent Number: 5,613,471
[45] Date of Patent: Mar. 25, 1997

[54] DIESEL ENGINE USING FUEL JET IMPINGEMENT AND DIFFUSION

[76] Inventor: Yasuhito Yaoita, Wellstone Terras 2,12-32, Nagahama, Kanazawa-ku, Yokohama, 236, Japan

[21] Appl. No.: 369,148

[22] Filed: Jan. 5, 1995

[51] Int. Cl.[6] .................................................. F02B 3/00
[52] U.S. Cl. ........................................................ 123/298
[58] Field of Search ............................................ 123/298

[56] References Cited

U.S. PATENT DOCUMENTS

| | | | |
|---|---|---|---|
| 1,341,478 | 5/1920 | Platt et al. | 123/298 |
| 2,071,062 | 2/1937 | Cummins | 123/298 |
| 3,892,208 | 7/1975 | Anderson et al. | 123/298 |

Primary Examiner—Raymond A. Nelli

[57] ABSTRACT

A diesel engine using impingement and diffusion is described. In this diesel engine, both low smoke production and reduction of thermal load of the piston, as well as lighter construction of the piston, are realized. The main combustion chamber is situated in a part of the inner wall of the cylinder head. An impinging surface is made at the inner wall of the main combustion chamber in a way that the fuel jet after impingement, is dispersed from the edge of the impinging surface into the area of the main combustion chamber close to the squish area.

8 Claims, 11 Drawing Sheets

DIESEL ENGINE USING FUEL JET IMPINGEMENT AND DIFFUSION

1. TECHNICAL FIELD

The present invention relates to technologies for the reduction of smoke production of diesel engines. In particular, the present invention relates to the reduction of the thermal load of the impinging part and the piston of diesel engines, using fuel jet impingement and diffusion as well as higher possible engine speed.

2. BACKGROUND ART

FIG. 9 is a cross sectional view of OSKA-D, as shown in Japanese Patent application Kokai No. Showa 62-139921 and SAE Paper 901618. In FIG. 9, a deep cavity 1' on the top of the piston and the squish area 2, near the top of the piston are shown. The impinging surface 3 is protruding from the base of the cavity 1'. Injector 5 and impinging surface 3 are situated above the middle axis of the cylinder. The fuel jet is injected by a single hole injector 5 in the direction of the impinging surface 3. After impingement on the impinging surface 3, the fuel jet is dispersed into the whole area around the impinging surface. By squish and inverted squish, the fuel jet and air are mixed. Consequently, diffusivity of the fuel jet in OSKA-D is higher, and accordingly smoke production lower, than in direct fuel injection diesel engines not making use of impingement and diffusion.

FIG. 10 shows an embodiment where the impinging surface is installed on the apex of the injector, as explained in the Japanese trade journal 'Nainen kikan' (Internal Combustion Engines, Tokyo: Sankai-dô Press), April 1992, page 25. Exchange of the impinging part in this embodiment is relatively easy.

FIG. 11 is a cross sectional view of OSKA-DH, as shown in 'Nainen kikan', June 1993, page 57. In FIG. 11, the impinging surface 3, projecting into the cavity 1', is installed at the cylinder head near the injector 5 by use of three legs 10. If the fuel jet is impinging on the hot impinging surface 3, fuel carburetion and mixture formation, after impingement, will be achieved faster and the ignition delay can be shortened. As a result, the quantity of the fuel injected until firing is decreased, the abrupt rise of pressure and temperature at the beginning of combustion is restricted, and the production of $NO_x$ is decreased.

After the lowering of the piston, the direction of the fuel jet after diffusion and the direction of squish are identical and the fuel jet easily flows into the squish area.

Therefore, in OSKA-DH the diffusivity of the fuel jet during inverted squish is higher and, accordingly, the production of smoke lower than in OSKA-D.

However, in these embodiments it is necessary to make a deep concave cavity on the top of the piston. As a result, the upper part of the piston gets longer and the piston heavier, resulting in upper limits for engine speed. Additionally, in these embodiments the size of the top surface of the piston in direct contact with the combustion gas is larger than in pistons with a flat top and thus the thermal load of the piston is increased.

In OSKA-DH, both sides of the impinging part are heated up by the combustion gas. However, the cross section of the legs 10 connecting the impinging part and cylinder head cannot be made very big. As a result, cooling of the impinging part becomes difficult and the thermal load of the impinging part is increased. In OSKA-D, the impinging surface is totally projecting into the combustion gas and the thermal load of the impinging pan, is increased as well.

Additionally, as the impinging part is projecting into the combustion chamber, the construction of the combustion chamber in these embodiments is complicated.

3. SUMMARY OF THE INVENTION

The purpose of this invention is to achieve higher diffusion of the fuel jet by solving at the same time the following four problems: (1) reduction of the thermal load of the impinging part, (2) reduction of the thermal load of the piston, (3) reduction of the weight of the piston, (4) simpler construction of the combustion chamber.

4. BRIEF DESCRIPTIONS OF THE DRAWINGS

5. DETAILED DESCRIPTION OF THE INVENTION

Figure 1:
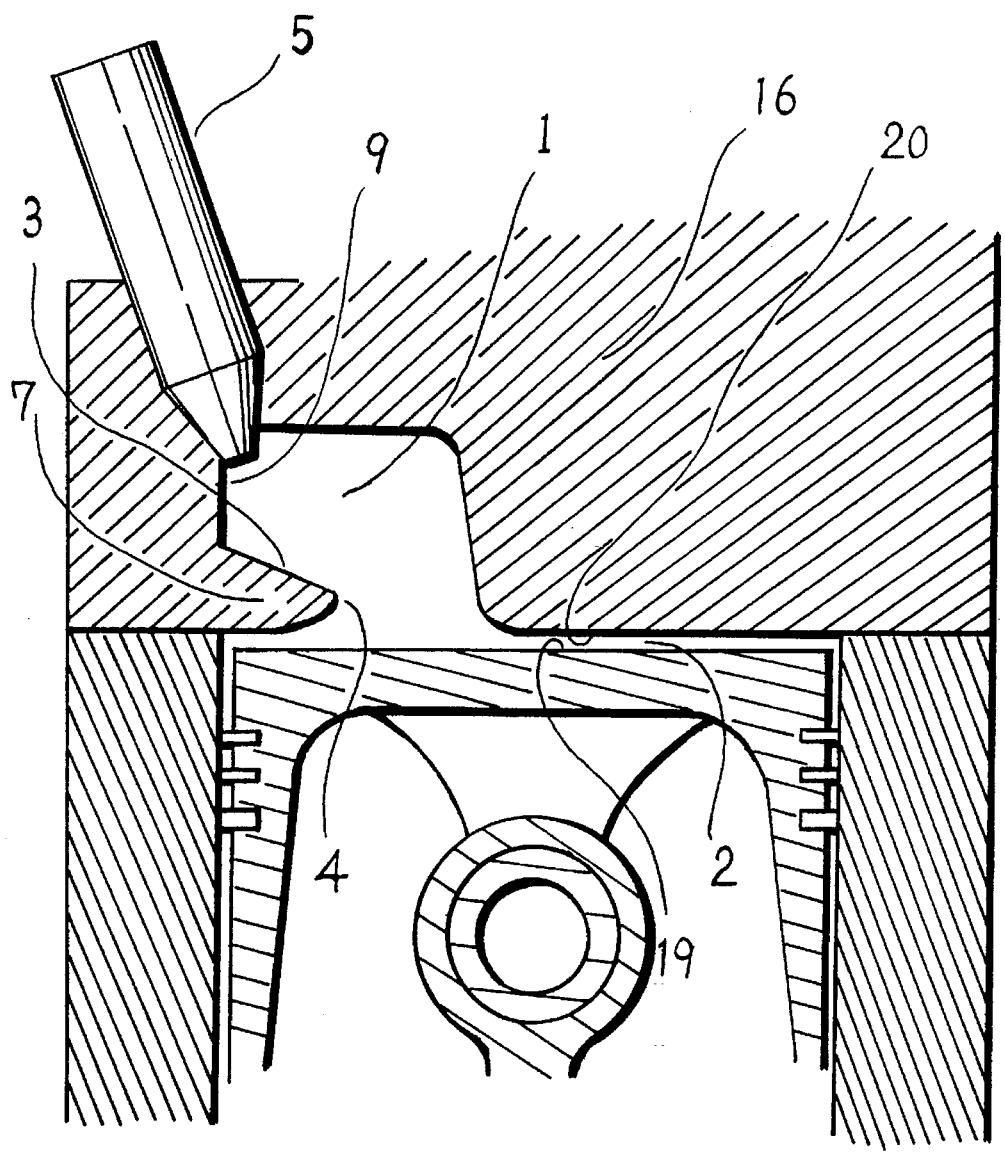
FIG. 1 is a cross sectional view of a preferred embodiment where the impinging surface and its edge are protruding from the side wall of the main combustion chamber that is aligned with the cylinder side wall.

With reference to FIG. 1, we will now explain the preferred embodiment, a direct fuel injection diesel engine using an impinging surface protruding from the wall of the main combustion chamber. FIG. 1 is a cross sectional of the combustion chamber of the preferred embodiment at the end of the compression stroke.

The main combustion chamber 1, is made in the region between part of the inner wall of the cylinder head 16 and the top 19 of the piston at the end of the compression stroke.

The squish area 2 is made between another part of the inner wall of the cylinder head 16 and the opposing top 19 of the piston.

Inlet and exhaust valves can be installed either in- or outside the main combustion chamber 1.

Impinging part 7 and impinging surface 3 are protruding from the side wall 9 of the main combustion chamber that is aligned with the cylinder side wall. The injector 5 is installed inside the main combustion chamber. The fuel jet is injected by the injector 5 towards the impinging surface 3 in a way that the direction of the fuel jet, and the impinging surface 3, form an acute angle. The fuel jet is now impinging 'obliquely' on the impinging surface 3.

To make the dispersion of the fuel jet from the impinging surface into the main combustion chamber possible, an edge 4 of the impinging surface 3 is constructed in the flow direction of the fuel jet after impingement at the impinging surface 3.

The impinging surface 3 and its edge 4 are constructed in a way that the fuel jet disperses, after impingement, into the main combustion chamber 1, and especially into the part close to the squish area 2. The edge 4 of the impinging surface 3 can either be rectangular shaped or with a small curve.

High diffusivity can be achieved, if the fuel jet is dispersed widely into the space of the main combustion chamber close to the squish area. To achieve this goal, a multi hole injector can be used: Several fuel jets are impinging obliquely on a plural number of impinging surfaces. Wide dispersion is also assured, if the angle between the direction of the fuel jet and the impinging surface 3, is closed to a right angle. In this case, a single hole injector 5 can be used.

Next, the working of the preferred embodiment in FIG. 1 will be explained.

In the case of oblique impingement of a fuel jet on an impinging surface, fuel spray is dispersed mainly in flow direction of the fuel jet after impingement, but not in the opposite direction (see: 'Nainen kikan', June 1991, p. 29,). Also, the density of the fuel jet immediately after impingement, is reduced considerably. After impingement, the fuel jet is dispersed widely into the area of the main combustion chamber in front of the edge 4 of the impinging surface 3, and close to the squish area 2.

Figure 2:
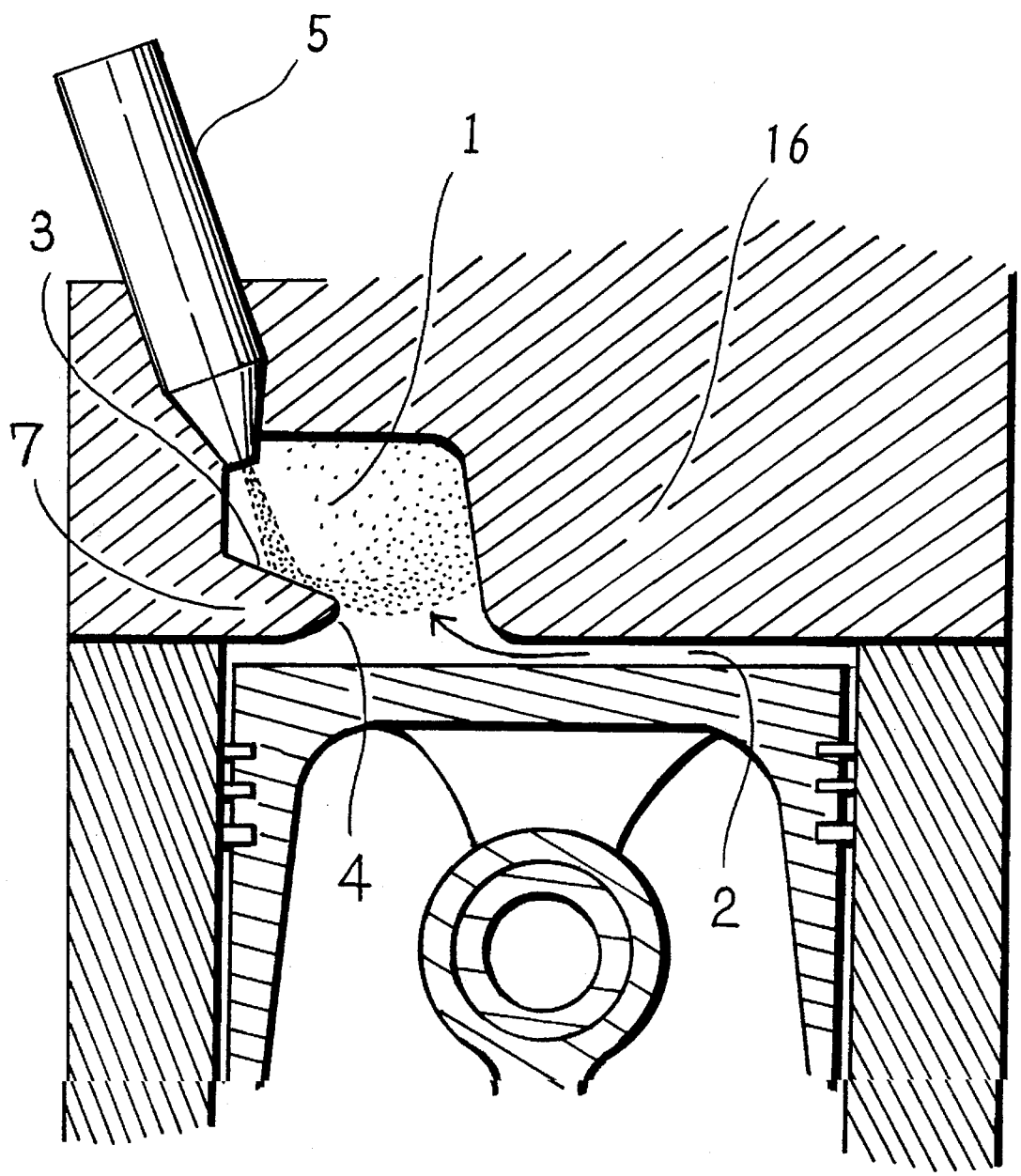
FIG. 2 shows the working of the preferred embodiment of FIG. 1, from the beginning of fuel injection until firing.

From the beginning of fuel injection to firing, the fuel jet (marked with dots), dispersed from the impinging surface 3 and its edge 4 into the area of the main combustion chamber close to the squish area, is diffused and mixed by squish (market with arrow), as shown in FIG. 2.

Figure 3:
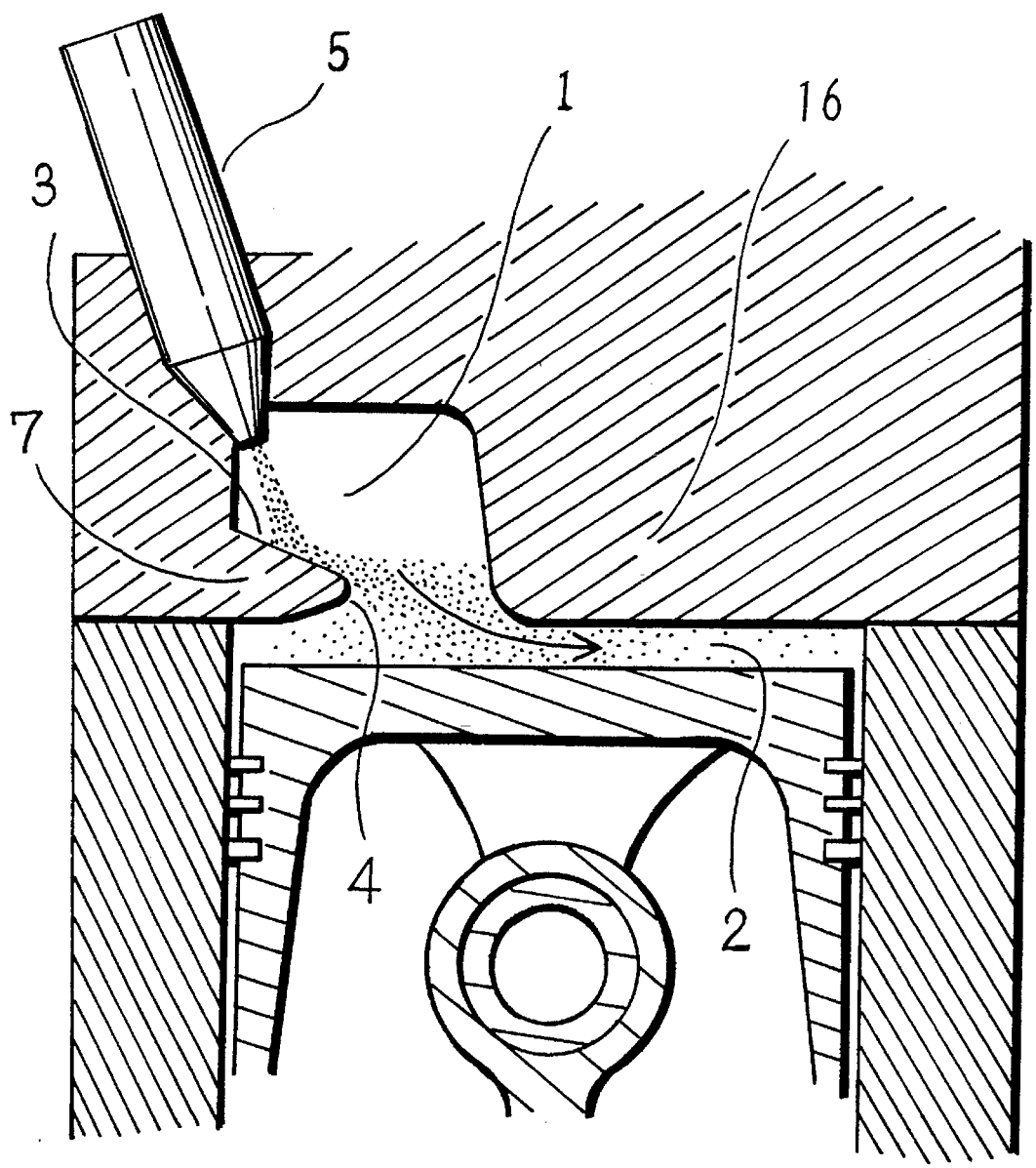
FIG. 3 shows the working of the preferred embodiment of FIG. 1 at the moment of firing.

At firing, the fuel jet impinging after firing is mixed and burned by inverted squish (marked with arrow) in the air layer inside the squish area 2, as shown in FIG. 3.

In summary, in the preferred embodiment presented in FIG. 1 higher diffusivity of the fuel jet and lower smoke production is achieved, than in direct fuel injection diesel engines not using impingement and diffusion.

Additionally, the impinging part 7 in the preferred embodiment of FIG. 1 is protruding. Therefore, the impinging surface is heated up by the combustion gas. If the fuel jet is then impinging on the impinging surface 3, carburetion of the fuel jet after impingement is accelerated and mixture formation can be achieved earlier. As a result, ignition delay is shorter than in direct fuel injection diesel engines without impingement and diffusion. Therefore, the quantity of fuel injected until ignition, this is, during premix combustion, is decreased. As a result, pressure and temperature in the initial phase of combustion are limited, and the production of NOx can be kept low.

In the preferred embodiment of FIG. 1, no deep main combustion chamber is made at the top of the piston. For this reason, the upper part of the piston becomes short, and the piston is lighter than that in the conventional engine. As a result, the piston in the embodiment of FIG. 1 is comparable to the weight of the piston in swirl chamber diesel engines and high speed and output, as in swirl chamber diesel engines, is realized.

In the presented invention, the main part, or even the whole of the main combustion chamber 1, is installed on one part of the side of the cylinder head opposing the inside of the cylinder. Additionally, the fuel jet, directed obliquely towards the impinging surface 3, is dispersed after impingement into the space inside the main combustion chamber close to the squish area.

If this two conditions are satisfied, smoke reduction can be achieved and higher speed and output is realized. Usage of the impinging surface 3 and the above mentioned edge 4 is not limited to the preferred embodiment as described in FIG. 1.

In the reminder, preferred embodiments other than the one depicted in FIG. 1 will be explained. These preferred embodiments, their working and their results, will be explained only in their main differences to the preferred embodiment of FIG. 1.

Figure 4:
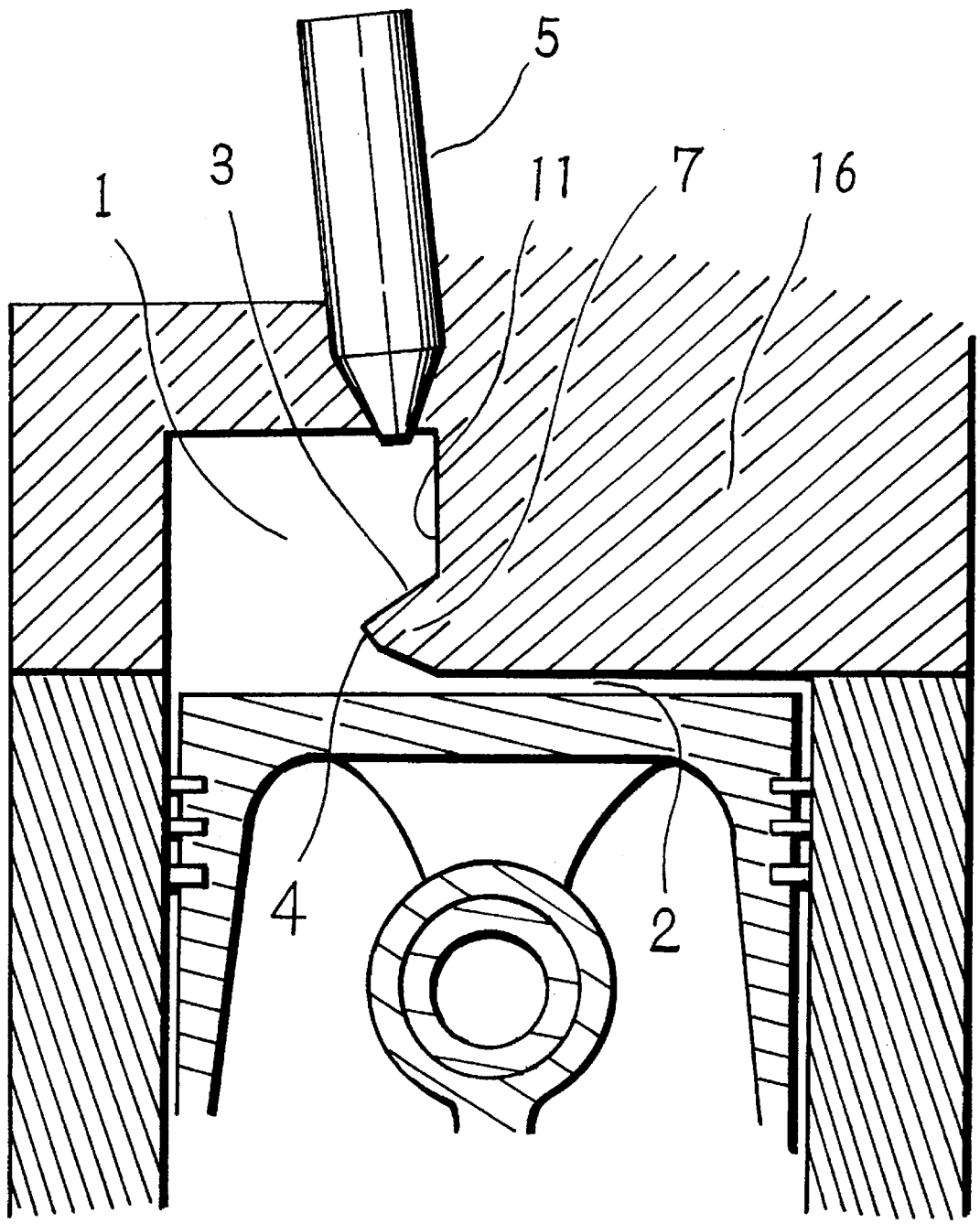
FIG. 4 is a cross sectional view of a preferred embodiment where the impinging surface and its edge are protruding from the side wall of the main combustion chamber on the part of the central axis of the cylinder.

As shown in FIG. 4, it is also possible to make the impinging part 7 and the impinging surface 3, protruding from the side wall 11 of the main combustion chamber 1 at the part of the main axis of the cylinder.

Figure 5:
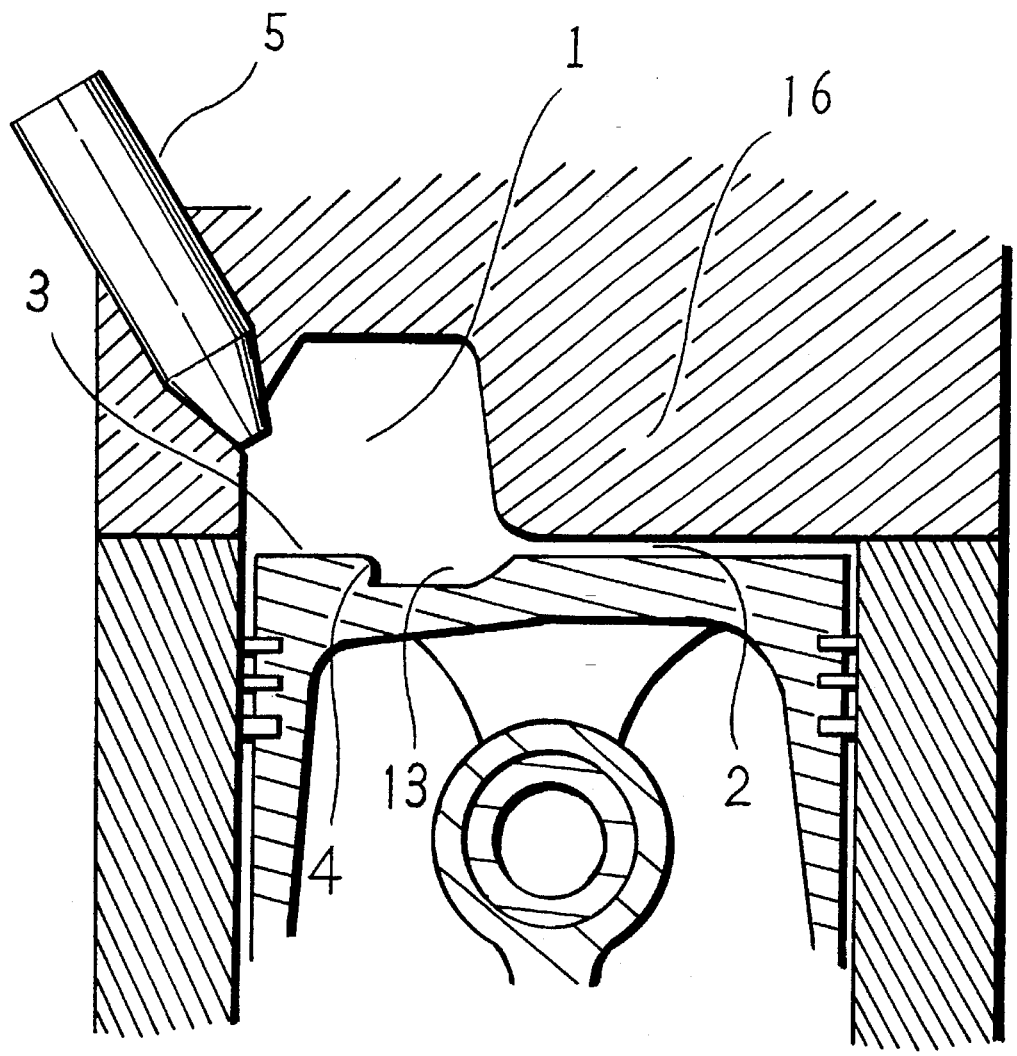
FIG. 5 is a cross sectional view of a preferred embodiment where the impinging surface and its edge are made on the outer side of the top surface of the piston.

As shown in FIG. 5, the impinging surface 3 can also be made on the outer side of the top surface of the piston which is opposing the main combustion chamber 1 at the end of the compression stroke.

In this preferred embodiment, a shallow depression 13 is made into the top of the piston between the impinging surface 3 and the squish area 2. The edge 4 of the impinging surface 3 is bent abruptly. As a result, the fuel jet can disperse into the space in and above the shallow depression 13.

Figure 6:
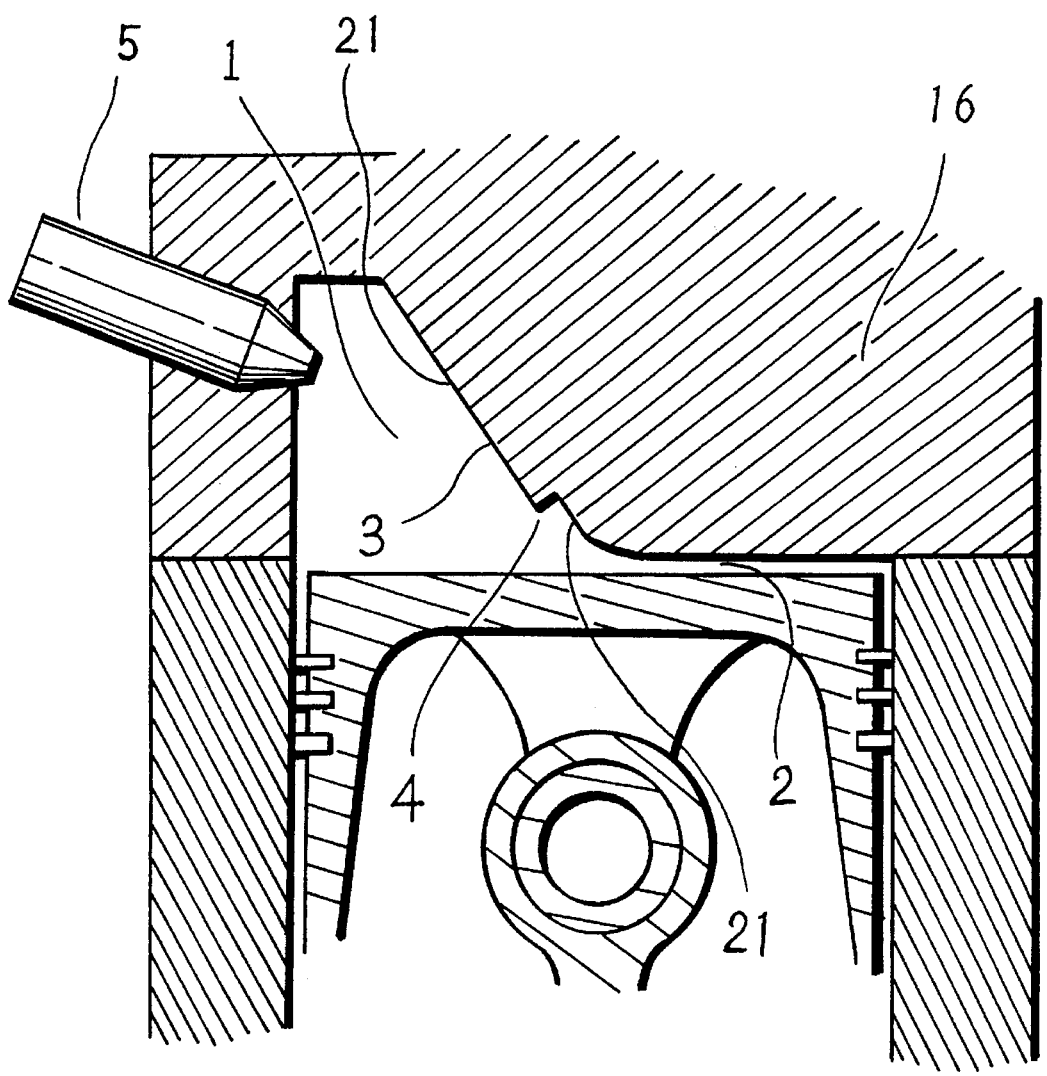
FIG. 6 is a cross sectional view of a preferred embodiment where the impinging part and its edge are installed at the cylinder-head's inner wall of the main combustion chamber which is close to, and inclined towards, the squish area.

In FIG. 6, the cylinder-head's inner wall 21 of the main combustion chamber 1 which is close to the squish area 2, is inclined towards the squish area 2. In this case, the impinging surface 3 and its above mentioned edge 4 can be installed on this cylinder-head's inner wall. The injector 5 is now installed on the side of the main combustion chamber that aligned with the cylinder side wall. After oblique impingement at the impinging surface, the fuel jet is dispersed from the above mentioned edge 4 of the impinging part 3 into the space inside main combustion chamber 1.

In this preferred embodiment, only the side wall of the main combustion chamber on the part of the side wall 21 of the cylinder head is constructed upright.

As a modification of the preferred embodiment in FIG. 6, a shallow depression can be made into the top of the piston facing the above mentioned edge 4 of the impinging surface 3. In this preferred embodiment, the fuel jet after impingement is dispersed into this shallow depression.

Figure 7:
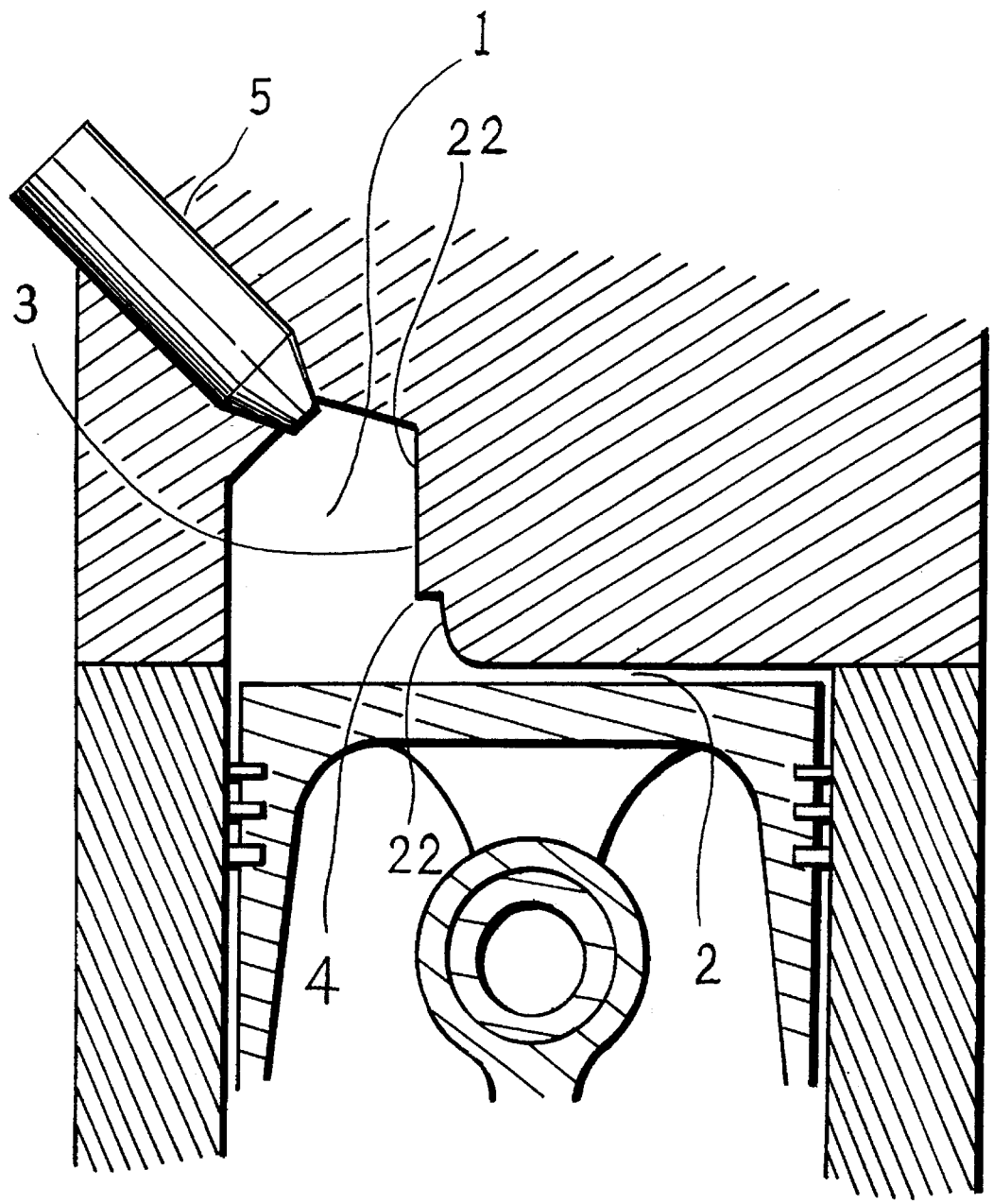
FIG. 7 is a cross sectional view of a preferred embodiment where the impinging part and its edge are installed at the upright cylinder-head's inner wall of the main combustion chamber in the vicinity of the squish area.

As shown in FIG. 7, the preferred embodiment described in FIG. 6 can also be modified in a way, that the inner wall 22 of the main combustion chamber, close to the squish area 2, is constructed upright. In this preferred embodiment, the impinging surface 3 and the above mentioned edge 4 will be installed on this inner wall 22.

In the preferred embodiments shown from FIG. 5 to FIG. 7, the impinging surface 3 is installed at the inner wall of the main combustion chamber 1 and the fuel jet is directed obliquely towards this impinging surface. Additionally, the above mentioned edge 4 is slightly protruding from only part of the impinging surface 3. Protrusion of the edge 4 is kept at a minimum. Accordingly, the heat flow into the impinging surface and edge, is easily transferred inside either the piston (as in the preferred embodiment of FIG. 5) or the cylinder head (as in the preferred embodiments of FIGS. 6 and 7).

Therefore the thermal load of the impinging part of the preferred embodiments from FIGS. 5 to 7 is lower than in embodiments where the edge 4 is constructed around the whole margin of the impinging surface 3. Additionally, higher durability can be achieved as a real impinging part is not necessary any more. Also, the construction of the combustion chamber can be simplified and higher reliability can be achieved, as there is no danger of the impinging part 7 falling into the cylinder.

As the temperature of the impinging surface is lower in these preferred embodiments than in other embodiments, carbretion of the fuel jet after impingement takes place later than in other embodiments and a similar level of smoke reduction is achieved.

Figure 8:
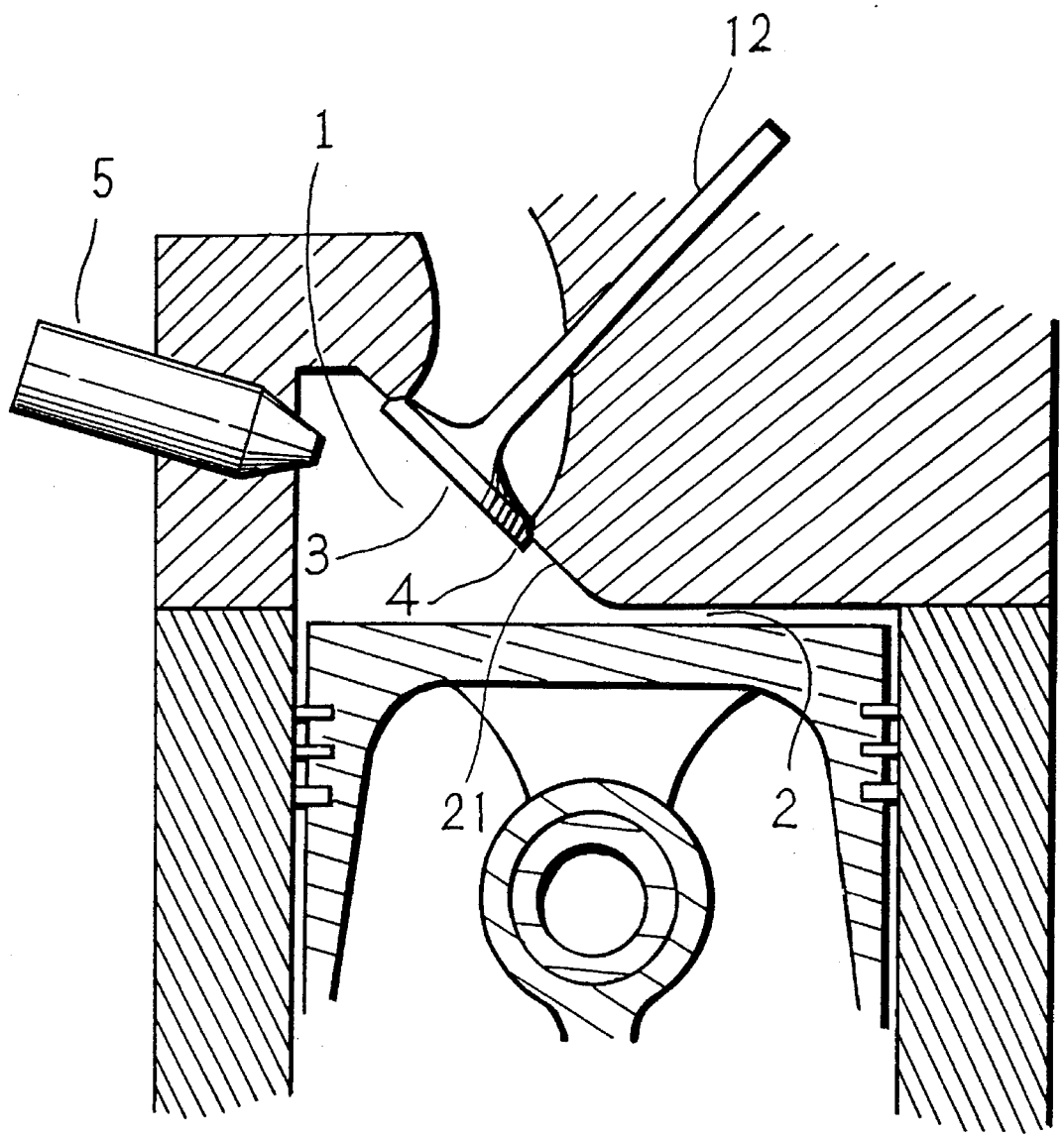
FIG. 8 is a cross sectional view of a preferred embodiment where an exhaust valve is installed at the cylinder-head's inner wall of the main combustion chamber, which is located close to, and inclined towards, the squish area.
Figure 9:
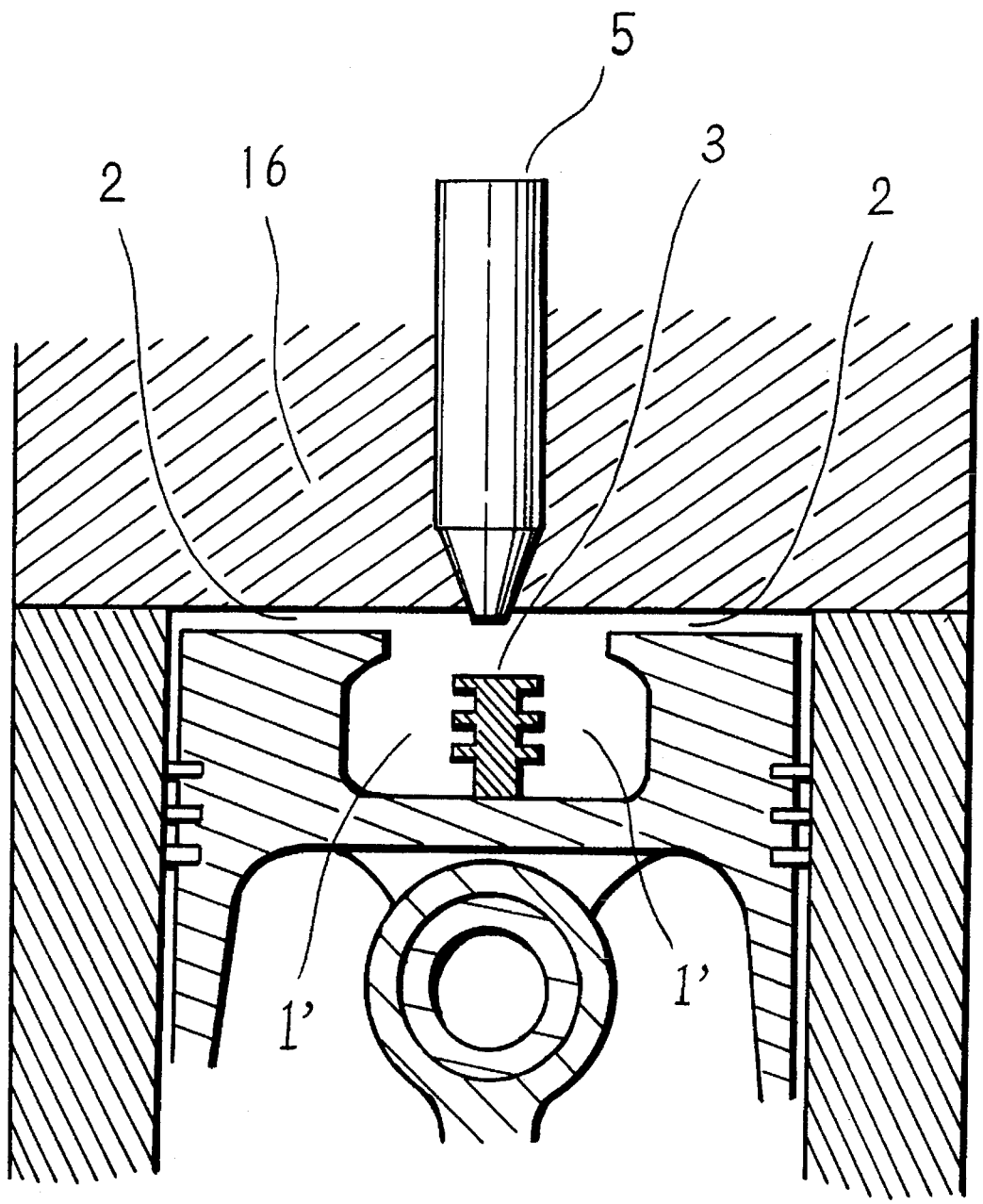
FIG. 9 is a cross sectional view of the embodiment OSKA-D.
Figure 10:
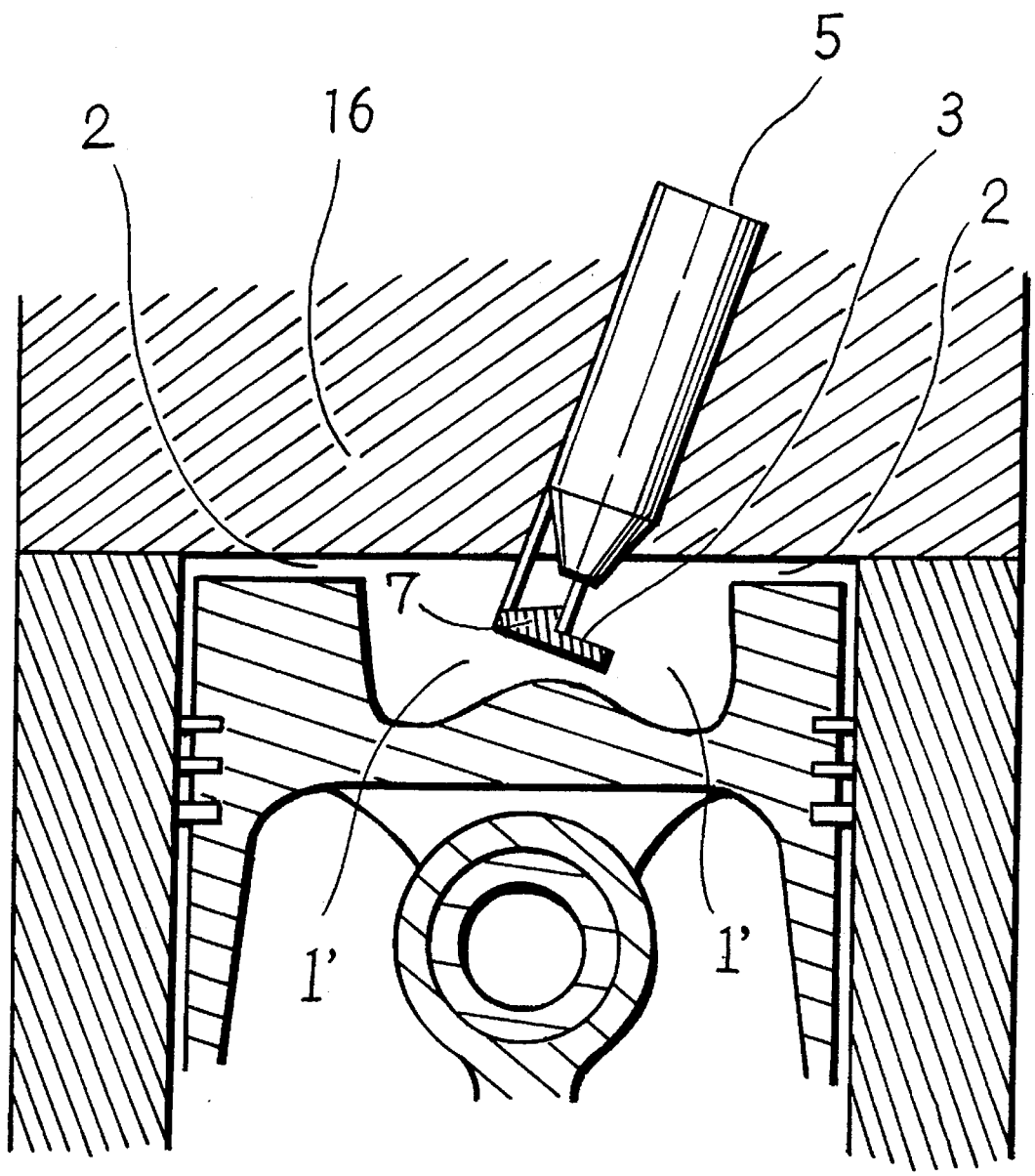
FIG. 10 is a cross sectional view of an embodiment where the impinging surface is installed on the apex of the injector.
Figure 11:
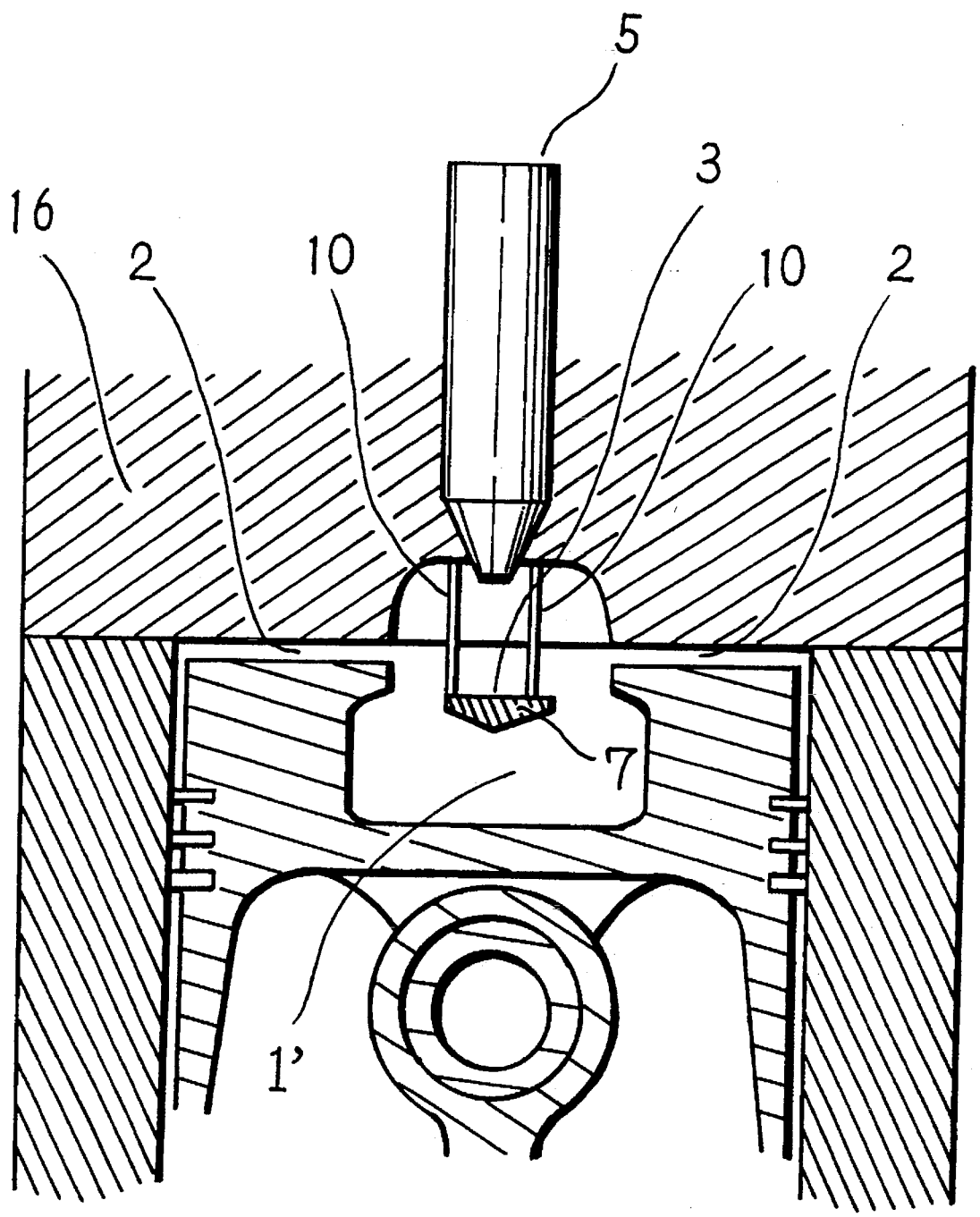
FIG. 11 is a cross sectional view of the embodiment OSKA-DH.

Additionally, as shown in FIG. 8, in the preferred embodiments of FIG. 6 and FIG. 7, an exhaust valve 12 can be installed at the cylinder-head's inner wall 21 of the main combustion chamber near the squish area 2. In this preferred embodiment, the base of the exhaust valve functions as a impinging surface 3. In this case, the base of the outer part of the exhaust valve 12 is protruding slightly from the cylinder-head's inner wall, and the above mentioned edge 4 is installed around this base. As a result, the fuel jet impinging on the base of the hot exhaust valve is heated up and NOx reduction, as in OSKA-DH, is achieved.

The preferred embodiments, as explained above, can be used in two-cycle as well as in four-cycle diesel engines.

We claim:

1. A diesel engine using fuel jet impingement and diffusion comprising:

a main combustion chamber formed on a part of an inner wall of a cylinder head which faces a space in a cylinder;

a squish area situated between another part of said inner wall of said cylinder head and an opposing top of said piston;

a fuel injector installed at said inner wall of the main combustion chamber;

an impinging surface to which fuel jet is obliquely injected from said fuel injector; and an edge of said impinging surface for causing said fuel jet after impinged to be dispersed into an area of said main combustion chamber close to said squish area.

2. The diesel engine using fuel jet impingement and diffusion as claimed in claim 1, wherein said impinging surface is located on said inner wall of said main combustion chamber.

3. The diesel engine using fuel jet impingement and diffusion as claimed in claim 2, wherein said impinging surface projects from said inner wall off said main combustion chamber at a side wall thereof which is aligned with a cylinder side wall.

4. The diesel engine using fuel jet impingement and diffusion as claimed in claim 2, wherein said impinging surface is located on said inner wall of said main combustion chamber opposing a side wall thereof which is aligned with a cylinder side wall.

5. The diesel engine using fuel jet impingement and diffusion as claimed in claim 4, wherein said impinging surface projects from said inner wall of said main combustion chamber.

6. The diesel engine using fuel jet impingement and diffusion as claimed in claim 4, wherein said inner wall of said main combustion chamber where said impingement surface is formed is perpendicular to said squish area.

7. The diesel engine using fuel jet impingement and diffusion as claimed in claim 1, wherein said impinging surface is located on an outer side of a top surface of said piston.

8. The diesel engine using fuel jet impingement and diffusion as claimed in claim 1, wherein said impinging surface is located on a bottom of an exhaust valve which is installed on a side wall of said main combustion chamber.

* * * * *